United States Patent
Chan et al.

(10) Patent No.: US 10,565,872 B2
(45) Date of Patent: Feb. 18, 2020

(54) COGNITIVE SITUATION-AWARE VISION DEFICIENCY REMEDIATION

(71) Applicant: INTERNATIONAL BUSINESS MACHINES CORPORATION, Armonk, NY (US)

(72) Inventors: Yuk L. Chan, Rochester, NY (US); Lawrence A. Clevenger, Rhinebeck, NY (US); Alain Loiseau, Williston, VT (US); Deepti M. Naphade, Cupertino, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/830,204

(22) Filed: Dec. 4, 2017

(65) Prior Publication Data
US 2019/0172347 A1   Jun. 6, 2019

(51) Int. Cl.
| G06K 9/46 | (2006.01) |
| G08G 1/0967 | (2006.01) |
| G06K 9/00 | (2006.01) |
| B60Q 9/00 | (2006.01) |
| B60W 50/14 | (2020.01) |
| G08G 1/16 | (2006.01) |

(52) U.S. Cl.
CPC ............ *G08G 1/0967* (2013.01); *G06K 9/46* (2013.01); *G06K 9/4652* (2013.01); *B60Q 9/008* (2013.01); *B60W 50/14* (2013.01); *G06K 9/00805* (2013.01); *G06K 9/00825* (2013.01); *G08G 1/16* (2013.01); *G08G 1/165* (2013.01); *G08G 1/167* (2013.01)

(58) Field of Classification Search
CPC .. G06K 9/00805; G06K 9/00825; G06K 9/46; B60Q 9/008; B60W 2050/146; B60W 2420/42; B60W 2550/10; B60W 50/14; G08G 1/16; G08G 1/165; G08G 1/167
See application file for complete search history.

(56) References Cited

U.S. PATENT DOCUMENTS

| 6,442,473 | B1 | 8/2002 | Berstis | |
| 8,384,532 | B2 | 2/2013 | Szczerba et al. | |
| 8,493,198 | B1* | 7/2013 | Vasquez | B60Q 9/008 340/425.5 |
| 8,629,903 | B2 | 1/2014 | Seder et al. | |
| 9,373,046 | B2 | 6/2016 | Nelson | |
| 9,663,035 | B2 | 5/2017 | Nakata et al. | |
| 10,102,763 | B2 | 10/2018 | Mihai | |
| 2003/0112132 | A1 | 6/2003 | Trajkovic et al. | |
| 2004/0051659 | A1 | 3/2004 | Garrison | |
| 2004/0085327 | A1 | 5/2004 | Jones et al. | |

(Continued)

OTHER PUBLICATIONS

Chan, Yuk L. et al., Pending U.S. Appl. No. 15/830,207 entitled "Cognitive Situation-Aware Vision Deficiency Remediation" filed Dec. 4, 2017.

(Continued)

*Primary Examiner* — Benyam Haile
(74) *Attorney, Agent, or Firm* — Cantor Colburn LLP; William Kinnaman (57) ABSTRACT

Embodiments include methods, systems, and computer program products for remediating a vision deficiency. Aspects include receiving a user device signal indicating a vision deficiency hazard on a roadway and a user device location. Aspects also include sending a user warning signal to the user device.

20 Claims, 5 Drawing Sheets

(56) References Cited

U.S. PATENT DOCUMENTS

| | | | |
|---|---|---|---|
| 2006/0033880 A1 | 2/2006 | Korneluk | |
| 2006/0044119 A1 | 3/2006 | Egelhaaf | |
| 2006/0061586 A1 | 3/2006 | Brulle-Drews | |
| 2007/0103341 A1 | 5/2007 | Kreiner et al. | |
| 2013/0335435 A1 | 12/2013 | Ambrus et al. | |
| 2014/0098008 A1 | 4/2014 | Hatton | |
| 2015/0262487 A1* | 9/2015 | Cazanas | G08G 1/166 701/301 |
| 2016/0063761 A1* | 3/2016 | Sisbot | B60W 50/14 345/633 |
| 2016/0070965 A1 | 3/2016 | Nelson | |
| 2016/0379593 A1 | 12/2016 | Borenstein et al. | |
| 2017/0212513 A1* | 7/2017 | Iida | B60W 50/02 |

OTHER PUBLICATIONS

Chan, Yuk L. et al., Pending U.S. Appl. No. 15/830,209 entitled "Cognitive Situation-Aware Vision Deficiency Remediation" filed Dec. 4, 2017.

Chan, Yuk L. et al., Pending U.S. Appl. No. 15/830,211 entitled "Cognitive Situation-Aware Vision Deficiency Remediation" filed Dec. 4, 2017.

colourblindawareness.org, "Colour Blind Awareness Day 2017—Colour Blindness," URL: http://www.colourblindawareness.org/colour-blindness/; Retrieved on Feb. 26, 2018; 2 pages.

Hall-Geisler, "Augmented Reality is Coming to Your Windshield—A holographic heads-up display ships later this year," Popular Science; May 14, 2015; URL: https://www.popsci.com/holographic-heads-display-wayray-way-0; Retrieved on Feb. 26, 2018; 2 pages.

Hsu, "Video: GM Turning Car Windshields into Augmented-Reality Navigation Displays—Still doesn't excuse driving one-handed while texting," Popular Science; Mar. 18, 2010; URL: http://www.popsci.com/cars/article/2010-03/gm-wants-turn-c; Retrieved on Feb. 26, 2018; 2 pages.

Mel, et al., "The NIST Definition of Cloud Computing," Recommendations of the National Institute of Standards and Technology; Special Publication 800-145; Sep. 2011; 7 pages.

\* cited by examiner

COGNITIVE SITUATION-AWARE VISION DEFICIENCY REMEDIATION

BACKGROUND

The present invention relates to vision deficiency, and more specifically, to cognitive and situation-aware systems and methods for assistance with vision deficiencies.

Vision deficiencies, such as color deficiencies including color blindness, can impair or prevent a person's ability to distinguish different colors. Different types and degrees of vision impairment exist, including color vision deficiencies ranging from an impaired ability to distinguish between two different colors to complete inability to perceive color. For instance, reading traffic lights, distinguishing between different types of signs, and discerning different objects from each other frequently depend on color distinctions that can be difficult or impossible to perceive for affected individuals. Color vision deficiencies can not only be inconvenient and impose difficulties in daily life, but can also be hazardous to affected individuals and the public at large.

SUMMARY

In accordance with one or more embodiments, a computer-implemented method for remediating a vision deficiency is provided. The method includes receiving, by a processor, a user device signal indicating a vision deficiency hazard on a roadway and a user device location. The method also includes sending a user warning signal to the user device.

In accordance with a further embodiment, a processing system for remediating a vision deficiency includes a processor in communication with one or more types of memory. The processor is configured to perform a method. The method includes receiving a user device signal indicating a vision deficiency hazard on a roadway and a user device location. The method also includes sending a user warning signal to the user device.

In accordance with another embodiment, a computer program product for remediating a vision deficiency is provided. The computer program product includes a computer readable storage medium readable by a processing circuit and storing program instructions for execution by the processing circuit for performing a method. The method includes receiving a user device signal indicating a vision deficiency hazard on a roadway and a user device location. The method also includes sending a user warning signal to the user device.

BRIEF DESCRIPTION OF THE DRAWINGS

The subject matter of the present invention is particularly pointed out and distinctly claimed in the claims at the conclusion of the specification. The foregoing and other features and advantages of the one or more embodiments described herein are apparent from the following detailed description taken in conjunction with the accompanying drawings in which:

DETAILED DESCRIPTION

Vision deficiencies, such as color blindness, can involve a reduced ability or inability to distinguish between objects and colors. Different types of vision deficiencies exist and the types of colors that cannot be distinguished and the level of impairment can vary widely. Color vision deficiencies are often inherited, but can also be caused to varying degrees by disease, injury, medications, or aging. Inherited color blindness affects an estimated eight percent of the male population and approximately 0.5 percent of females. Affected individuals, in some cases, are unaware of their condition until they receive testing.

Perception of color in unaffected individuals results from absorption of light by rod and cone cells in the retina. In the retina, three types of cone cells are present in normal individuals, wherein each type of cone cell is receptive to light of a specific wavelength range. The three types of cone cells, in combination, can enable normal individuals to perceive all of the wavelengths of the visible spectrum. Color vision impairment can result when one or more types of cones are impaired, altered, or absent.

Major types of color vision deficiencies include, for instance, protanopia, deuteranopia, tritanopia, protanomaly, and deuteranomaly, which can each be associated with certain permutations of color confusion that accompany cone defects or absences. Protanopia, for instance, involves the complete absence of one of the three types of cone cells in the retina, long cones. Protanopia is a type of "red-green" color blindness, although it can involve deficiencies in an array of colors in addition to red and green. Protanopia can manifest in an affected individual with certain characteristic color confusions: black is likely to be confused with many shades of red; dark brown is likely to be confused with dark green, dark orange, and dark red; some blues are likely to be confused with some reds, purples and dark pinks; and mid-greens are likely to be confused with some oranges. Tritanopia, sometimes referred to as "blue-yellow" color blindness, can manifest with blue, indigo and violet appearing greenish or black, yellow appearing the same as pink, and purple appearing as shades of red.

Hue intensity can also be misperceived by individuals affected with color vision deficiencies. For instance, in the case of protanopia, orange-tinted reds can be perceived is dim or muted yellow. In tritanopia, blue, indigo, and violet can be severely dimmed.

Impairments in the ability to distinguish between different colors, and alteration of hue intensity, can be hazardous to affected individuals and also to unaffected individuals that come in contact with such individuals. For instance, when driving on the road, vision deficiencies, such as color vision deficiencies, could impair a driver' s ability to see a neighboring car if its color is similar to the background. Such impairments can put the driver and surrounding drivers at risk of collision.

Existing solutions for vision deficiencies are limited and there is no cure for color blindness. Some devices and methods have been used or proposed to provide relief to affected individuals, but special lenses that shift the existing spectrum of light to another spectrum have provided limited assistance to some affected individuals. Such lenses can, for example, shift the light wavelength of an imperceptible color to a wavelength that can be perceived. However, the transformation range for such lenses is static. Existing technologies fail to account for situational aspects that could impact the ability to perceive objects. Moreover, existing technologies provide unsatisfactory correction and remediation of issues stemming from impairment of contrast and brightness that can be associated with vision deficiencies.

Embodiments of the present invention provide dynamic and cognitive assistance with vision deficiencies using a situation-aware approach. Embodiments of the invention can leverage advances in mobile technologies to provide contextually-aware solutions for the perception of objects for affected individuals. Some embodiments of the invention can combine situation awareness and image processing technologies with available computing power on wearable devices to determine an appropriate color to overlay on a target image. Target images, according to embodiments of the invention, can be personalized to a user, for instance by being based upon a user's particularized vision deficiency or by being based upon a context or setting related to the image. Embodiments of the invention can overlay an image of objects having color(s) that impair perception by an individual affected by a color vision deficiency with a color or texture that can be perceived by the individual.

It is understood in advance that although this description includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure including a network of interconnected nodes.

Figure 1:
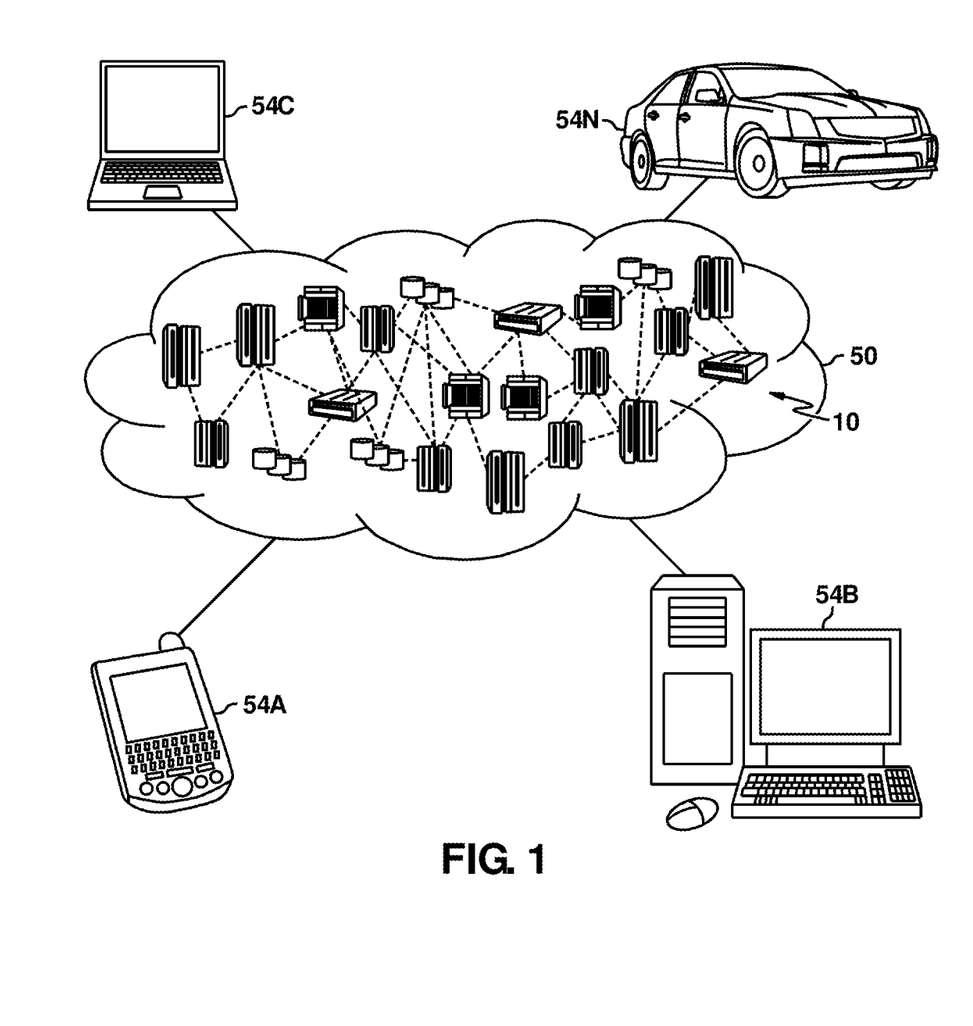
FIG. 1 depicts a cloud computing environment according to an embodiment of the present invention.

Referring now to FIG. 1, illustrative cloud computing environment 50 according to one or more embodiments of the present invention is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
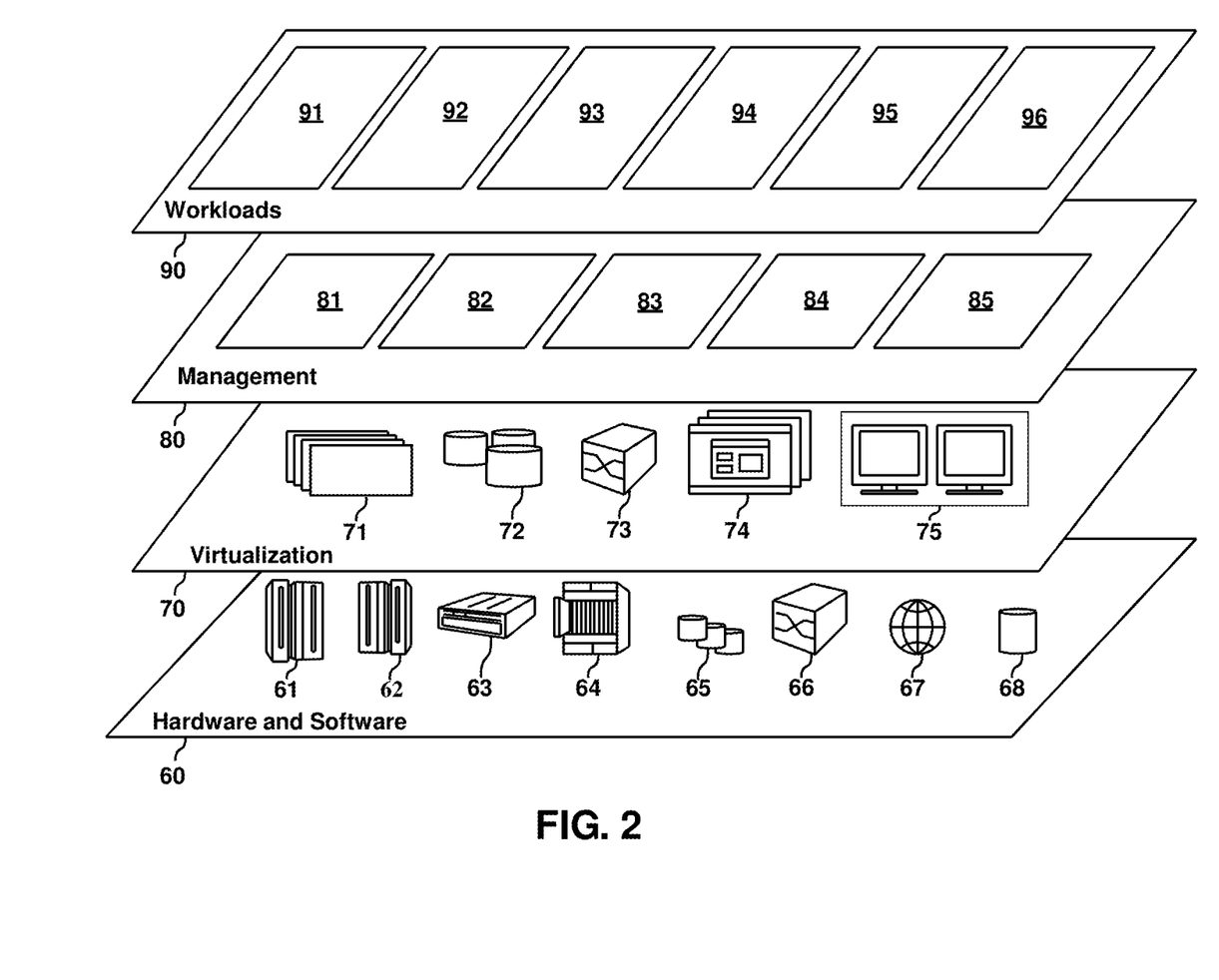
FIG. 2 depicts abstraction model layers according to an embodiment of the present invention.

Referring now to FIG. 2, a set of functional abstraction layers provided by cloud computing environment 50 (FIG. 1) according to one or more embodiments of the present invention is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and vision assistance 96.

Figure 3:
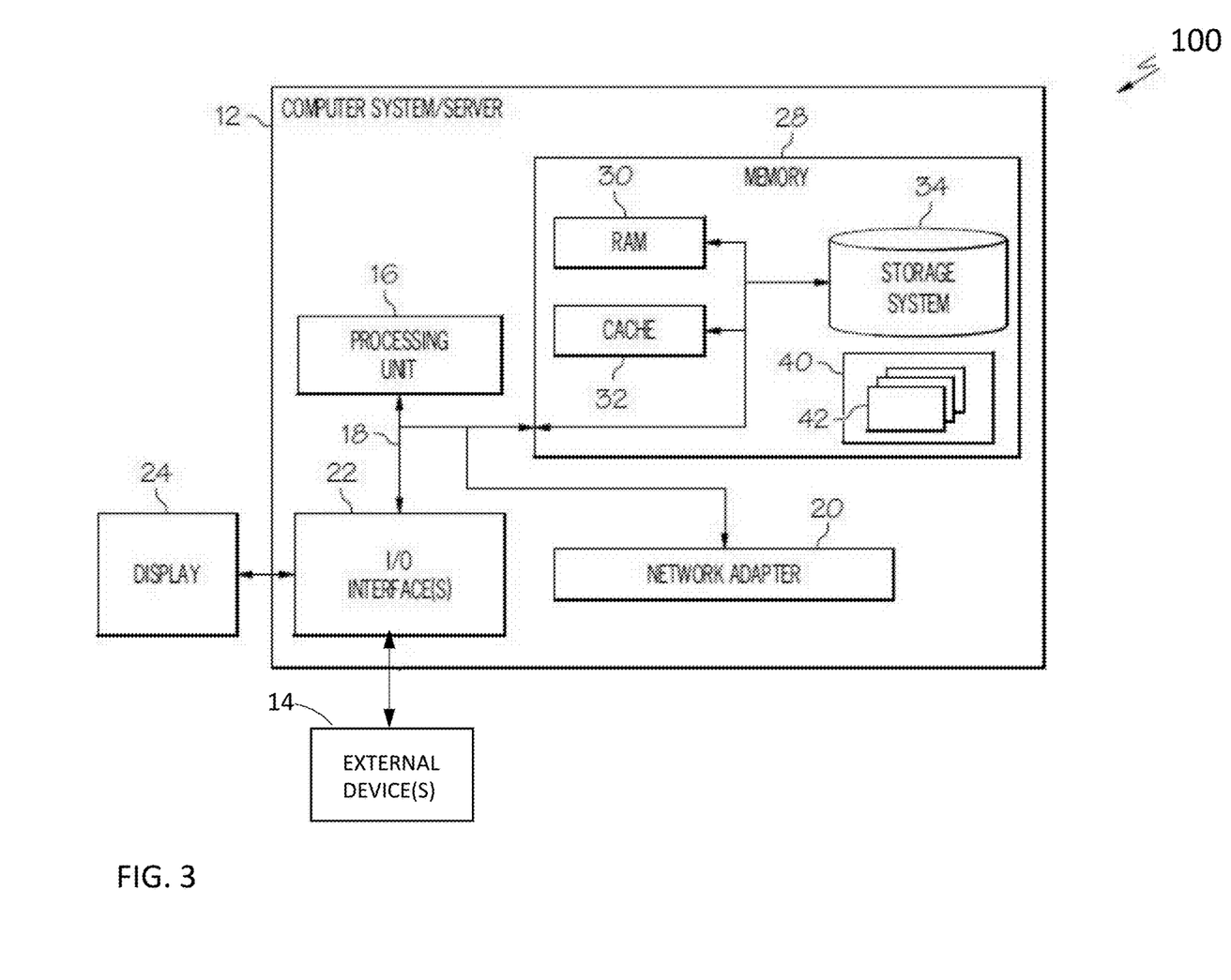
FIG. 3 depicts a computer system according to one or more embodiments of the present invention.

Referring now to FIG. 3, a schematic of a cloud computing node 100 included in a distributed cloud environment or cloud service network is shown according to one or more embodiments of the present invention. The cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 12, which is operational with numerous other general purpose or special purpose computing system environments or configurations. Examples of well-known computing systems, environments, and/or configurations that can be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 can be described in the general context of computer system-executable instructions, such as program modules, being executed by a computer system. Generally, program modules can include routines, programs, objects, components, logic, data structures, and so on that perform particular tasks or implement particular abstract data types. Computer system/server 12 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 3, computer system/server 12 in cloud computing node 100 is shown in the form of a general-purpose computing device. The components of computer system/server 12 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out one or more functions and/or methodologies in accordance with some embodiments of the present invention.

Computer system/server 12 can also communicate with one or more external devices 14 such as a keyboard, a pointing device, a display 24, etc., one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
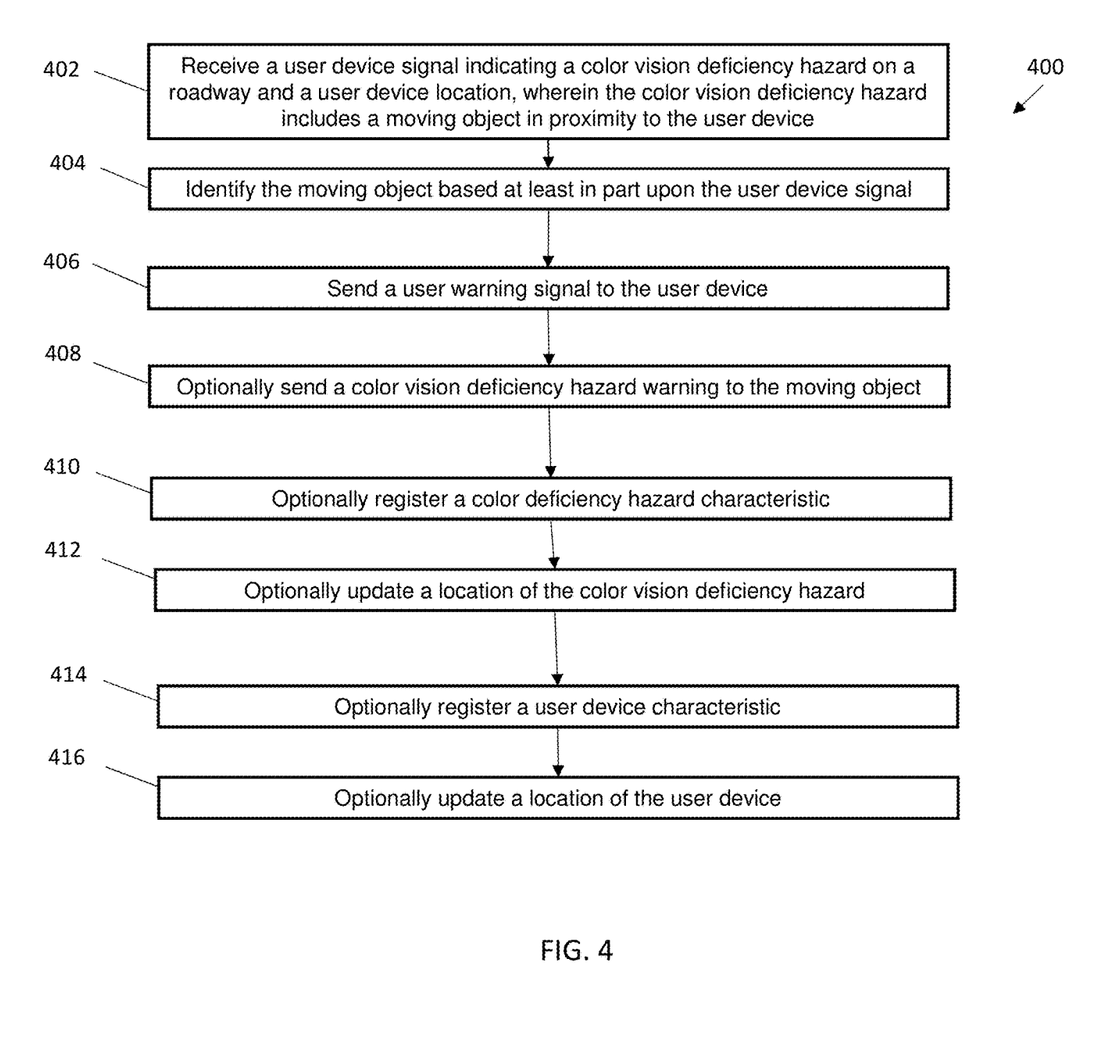
FIG. 4 is a flow diagram illustrating a method for remediating a vision deficiency according to one or more embodiments of the present invention.

FIG. 4 depicts a flowchart illustrating an exemplary method 400 for remediating a vision deficiency according to one or more embodiments of the present invention is shown. According to the method 400, a user device signal is received indicating a color vision deficiency hazard on a roadway and a user device location, wherein the color vision deficiency hazard includes a moving object in proximity to the user device, as shown at block 402. For example, a moving object in proximity to the user device can include an automobile of a color not visible to a user, for instance due to color vision impairment. The user device signal can include, for instance, a signal from a GPS antenna integrated into a vehicle or a signal from a portable user device, such as a cellular phone, tablet, or wearable device. The user device signal can include location image data, for instance from cameras on vehicles on a roadway, and/or positional data from which location image data can be determined, for example, from geo-tagged images, such as social network images or Google Earth images.

The method 400 also includes, as shown at block 404, identifying the moving object based at least in part upon the user device signal. For example, an identification can include an object type. Exemplary object types include, but are not limited to, a car, a wall, a fence, an undetermined object, etc.

The method 400 also includes, as shown at block 406, sending a warning signal to the user device. The method 400 also includes, as shown at block 408, optionally sending a vision deficiency hazard warning to the moving object.

A warning signal can include an auditory signal, a visual signal, a haptic signal, or combinations thereof. For instance, a verbal identification of a hazard and/or hazard type can be sent. For example, the warning signal can include a statement that a "red car is approaching on a right hand side of a vehicle." In some embodiments of the invention, a warning signal includes a visual signal. For instance, a warning signal can include an image overlay including a flashing boundary around an obscured object.

Embodiments of the invention can overlay an image of objects having color(s) that impair perception by an individual affected by a color vision deficiency with a color or texture that can be perceived by the individual. In some embodiments of the invention, the image overlay can include a color replacement for an object. In some embodiments of the invention, the image overlay can include flashing, highlighting, outlining, labeling with text, combinations of colors and patterns, or combinations of the foregoing. In some embodiments of the invention, the image overlay includes an enhanced overlay for an object having an importance level above a threshold importance. For instance, an image overlay can include flashing boundaries around moving objects or annotated images when an object is obscured by a nearby object of similar color. For example, a red car traveling next to a red wall can be overlaid with an image including a flashing boundary around the car to enhance its visibility. For example, a brown cupcake and a white cupcake can be overlaid with labels such as "brown" or "white." In another example, the cupcakes can be labeled with intelligent annotation such as "peanut butter" and "lemon." Such intelligent annotations can be determined using contextual information retrieved from or captured by other sensors or devices such as Amazon Echo™, Google Home™, ordering systems for restaurants, Social Networks etc.

The method 400 also optionally includes, as shown at block 410, registering a color vision deficiency hazard characteristic, for instance to a cloud-based service. The method 400 also includes, as shown at block 412, optionally updating a location of the color vision deficiency hazard, for instance by periodically sampling the location of the hazard or by continuously sampling the location of the hazard for a set period of time and/or until the hazard is no longer present. The method 400 also includes, as shown at block 414, optionally registering a user device characteristic, such as type and severity of color vision deficiency experienced by the user of the device. The method 400 also includes, as shown at block 416, optionally updating a location of the user device, for instance by periodically sampling the location of the user until the hazard is no longer present or in proximity to the user.

Figure 5:
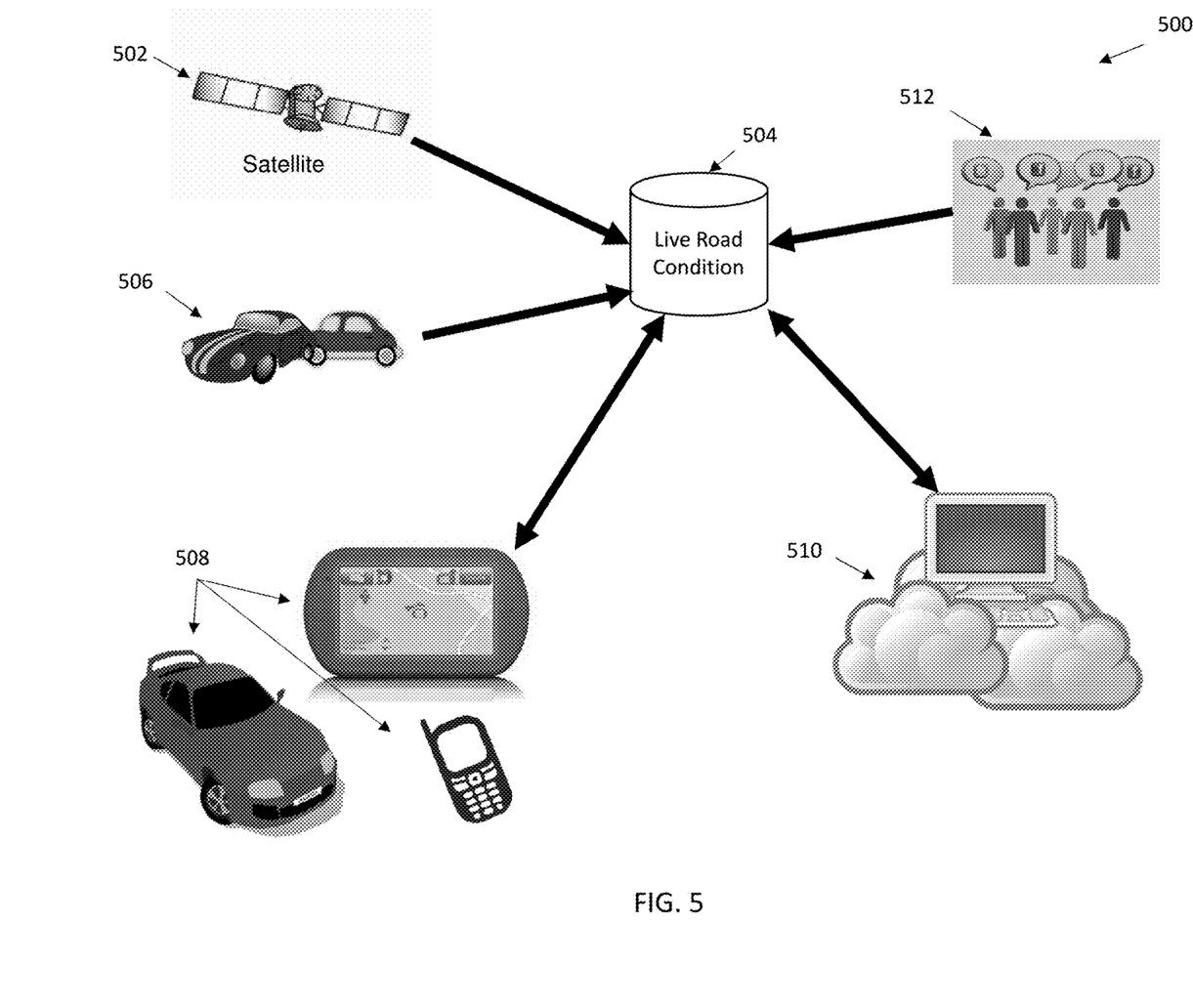
FIG. 5 depicts a diagram illustrating an exemplary system for remediating a vision deficiency according to one or more embodiments of the present invention.

FIG. 5 illustrates an exemplary system 500 for remediating a vision deficiency according to one or more embodiments of the present invention. The system 500 can include a live road condition reporting engine 504 in communication with one or more user devices 508 and a processing system 510. In some embodiments of the invention, the processing system 510 is a cloud-based system. The system can also include non-user vehicles 506, for example, vehicles on the road having cameras and geo-location identifiers, satellite imagery 502, and online geo-tagged images 512, such as social network images or Google Earth images, in communication with the live road condition reporting engine 504.

In some embodiments of the invention, the warning is personalized to a user, for instance the user can be driving, and warning can be tailored to highlight all cars or to generate a flashing boundary or color overlaid with the car obscured by color. In another example, the user can be walking across a street, and a warning can be generated to exclude cars that are stopped at the traffic light and include bicycles that are in motion, pot holes on the street, and the traffic light signal.

In some embodiments of the invention, the exemplary system 500 could analyze relative object movement in relation to a designated object or user. For instance, a system 500 can analyze a scene where a user of the system and other objects are changing their location relative to each other. For example, a user of the system can be statically located (i.e. not moving), while other objects are moving. In another example, a user of the system can be moving, while other objects are statically located (i.e. not moving). In another example, a user of the system and the other objects are both moving.

In some embodiments of the invention, a user and objects are moving and changing positions relative to one another and thereby changing their chance of affecting each other. For example, a user of a system and an object can be on the same road, driving in the same direction. In the example, the object is behind the user, but has a faster speed than the user. Therefore, the probability of the object getting closer to the user or meeting the user is very high (i.e. the object and the user can potentially affect each other). In this example, this object, the object color, the importance, and one or more attributes of the object (e.g. an aggressive driver that cut in front of others) can be considered for vision deficiency assistance.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form described. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There can be many variations to this diagram or the steps (or operations) described therein without departing from the spirit of embodiments of the invention. For instance, the steps can be performed in a differing order or steps can be added, deleted, or modified. All of these variations are considered a part of the claimed invention.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer implemented method for remediating a vision deficiency of a user, the method comprising:
   receiving a signal from a user device, the signal indicating a vision deficiency hazard and a user device location;
   performing an analysis of relative object movement in relation to a user associated with the user device and an object moving relative to the user; and
   sending a user warning signal to the user device based on the vision deficiency hazard exceeding a first predetermined threshold level of importance and the analysis of relative object movement, the warning signal comprising a visual signal providing an overlay image, wherein the overlay image comprises an object annotation and an enhanced overlay based on a determination that an importance level of the vision deficiency hazard exceeds a second predetermined threshold level of importance and that the object is obscured by a nearby object of similar color, the enhanced overlay comprising a flashing boundary around the object and the object annotation comprising a label of a characteristic of the object, wherein the object annotation is obtained from a third party system and the label is determined using contextual information about the object gathered by sensors associated with the third party system.

2. The method of claim 1, wherein the vision deficiency hazard includes the object moving relative to the user and the method further comprises identifying the object based at least in part upon the user device signal.

3. The method of claim 1, wherein the user warning signal comprises an audible signal.

4. The method of claim 1 further comprising sending a vision deficiency hazard warning warning to a moving object, wherein the moving object comprises a vehicle.

5. The method of claim 4, wherein the moving object warning comprises an audible signal.

6. The method of claim 1 further comprising registering a vision deficiency hazard characteristic.

7. The method of claim 1 further comprising updating a location of the vision deficiency hazard.

8. A processing system for remediating a vision deficiency of a user, comprising:
   a processor in communication with one or more types of memory, the processor configured to perform a method comprising:
   receiving a signal from a user device, the signal indicating a vision deficiency hazard on a roadway and a user device location;
   performing an analysis of relative object movement in relation to a user associated with the user device and an object moving relative to the user; and
   sending a user warning signal to the user device based on the vision deficiency hazard exceeding a first predetermined threshold level of importance and the analysis of relative object movement, the warning signal comprising a visual signal providing an overlay image, wherein the overlay image comprises an object annotation and an enhanced overlay based on a determination that an importance level of the vision deficiency hazard exceeds a second predetermined threshold level of importance and that the object is obscured by a nearby object of similar color, the enhanced overlay comprising a flashing boundary around the object and the object annotation comprising a label of a characteristic of the object, wherein the object annotation is obtained from a third party system and the label is determined using contextual information about the object gathered by sensors associated with the third party system.

9. The processing system of claim 8, wherein the vision deficiency hazard includes the object moving relative to the user and the method further comprises identifying the object based at least in part upon the user device signal.

10. The processing system of claim 9, wherein the method further comprises sending a moving object warning to a moving object.

11. The processing system of claim 8, wherein the user warning signal comprises an audible signal.

12. The processing system of claim 8, wherein the method further comprises registering a vision deficiency hazard characteristic.

13. The processing system of claim 8, wherein the method further comprises updating a location of the vision deficiency hazard.

14. The processing system of claim 8, wherein the method further comprises sending the signal to a cloud-based server.

15. A computer program product for remediating a vision deficiency of a user, the computer program product comprising:
a non-transitory computer readable storage medium readable by a processing circuit and storing program instructions for execution by the processing circuit for performing a method comprising:
receiving a signal from a user device, the signal indicating a vision deficiency hazard on a roadway and a user device location;
performing an analysis of relative object movement in relation to a user associated with the user device and an object moving relative to the user, and
sending a user warning signal to the user device based on the vision deficiency hazard exceeding a first predetermined threshold level of importance and the analysis of relative object movement, the warning signal comprising a visual signal providing an overlay image, wherein the overlay image comprises an object annotation and an enhanced overlay based on a determination that an importance level of the vision deficiency hazard exceeds a second predetermined threshold level of importance and that the object is obscured by a nearby object of similar color, the enhanced overlay comprising a flashing boundary around the object and the object annotation comprising a label of a characteristic of the object, wherein the object annotation is obtained from a third party system and the label is determined using contextual information about the object gathered by sensors associated with the third party system.

16. The computer program product of claim 15, wherein the user warning signal comprises an audible signal.

17. The computer program product of claim 15, wherein the vision deficiency hazard includes the object moving relative to the user and the method further comprises identifying the object based at least in part upon the user device signal.

18. The computer program product of claim 15, wherein a software is provided as a service in a cloud environment.

19. The method of claim 1, wherein the third party system comprises a social networking system.

20. The method of claim 1, wherein the third party system comprises a merchant system.

\* \* \* \* \*